Oct. 14, 1958    H. E. ALTGELT    2,855,835
HITCH DEVICE

Filed July 16, 1953    3 Sheets-Sheet 1

INVENTOR.
HERMAN E. ALTGELT
BY
Roger C. Johnson
ATTORNEY

INVENTOR.
HERMAN E. ALTGELT
BY
Roger C. Johnson
ATTORNEY

Oct. 14, 1958 H. E. ALTGELT, 2,855,835
HITCH DEVICE
Filed July 16, 1953 3 Sheets-Sheet 3

INVENTOR.
HERMAN E. ALTGELT
BY
Roger C. Johnson
ATTORNEY

United States Patent Office 2,855,835
Patented Oct. 14, 1958

2,855,835

HITCH DEVICE

Herman E. Altgelt, Moline, Ill., assignor, by mesne assignments, to Deere & Company, a corporation of Delaware Application July 16, 1953, Serial No. 368,358

4 Claims. (Cl. 97—47.5)

The present invention relates generally to hitch devices for connecting farm implements to a tractor and more particularly to implements of the kind generally referred to as a three-point or four-point hitch, wherein the connection between the implement and the tractor is effected easily and conveniently through links, which swing vertically as well as horizontally, at the rear of the tractor.

The object and general nature of the present invention is the provision of a device of this general type, wherein provision is made for securing a virtual hitch point that falls generally underneath and/or relatively closely adjacent the rear axle of the tractor, whereby a steady running of the implement is produced with ample weight transfer to the tractor to secure good traction. More specifically, it is a feature of this invention to provide a hitch device of the pivoted link type wherein the pivots and/or the links are so constructed and arranged to secure the desired or required line of draft when in operation and, in addition, rapid entry into the ground when moving the implement from a transport into a working position.

Additionally, it is a feature of this invention to provide a lifting connection between the tractor lifting apparatus and the lower links of the hitch device, which link connection includes pivoted link members, with a connection from one of said members to the upper part of the implement for controlling the fore-and-aft tilting of the implement. According to the present invention, actuating the tractor power lift acts through the aforesaid links for imparting more or less rearward tilt to the upper part of the implement, thereby controlling the depth of operation, but when the implement is dropped to the ground from a transport position, the controlling links permit the upper part of the implement to tilt forwardly, whereby the ground-working tool means rapidly penetrates the ground and moves downwardly to the desired depth of operation.

A further feature of this invention is the provision of a hitch connection between a tractor-mounted implement and the supporting tractor, which provides for the required line of draft to secure steady operation and uniform penetration irrespective of up-and-down movement of the front end of the tractor, as when passing through swales, over ridges, or the like, with means whereby the depth of operation may readily be changed when necessary.

These and other objects and advantages of the present invention will be apparent to those skilled in the art after a consideration of the following detailed description, taken in conjunction with the accompanying drawings, in which.

Figure 1:
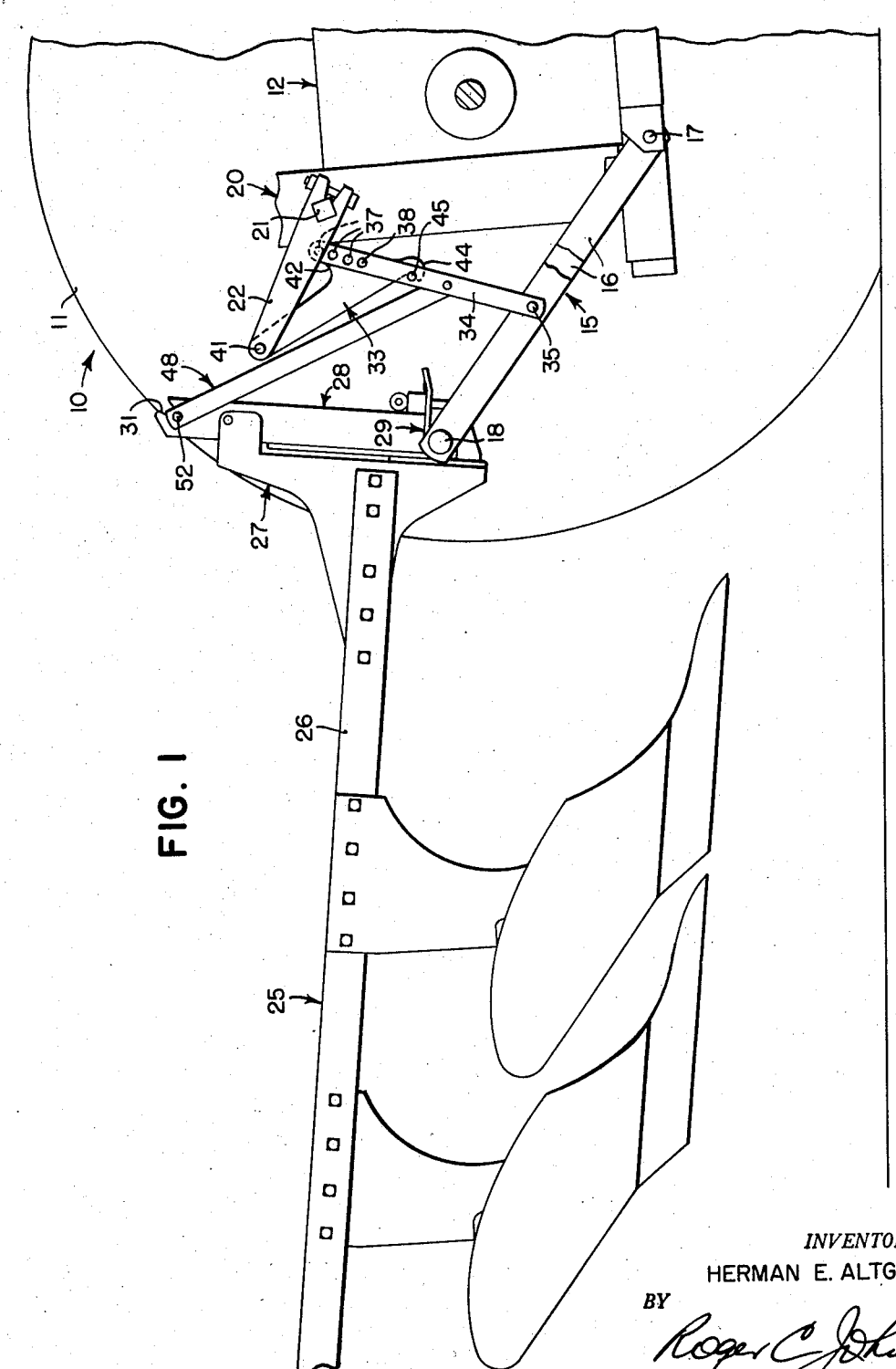
Fig. 1 is a side view of an implement and tractor combination, in which the principles of the present invention have been incorporated, showing the implement in its raised or transport position.
Figure 2:
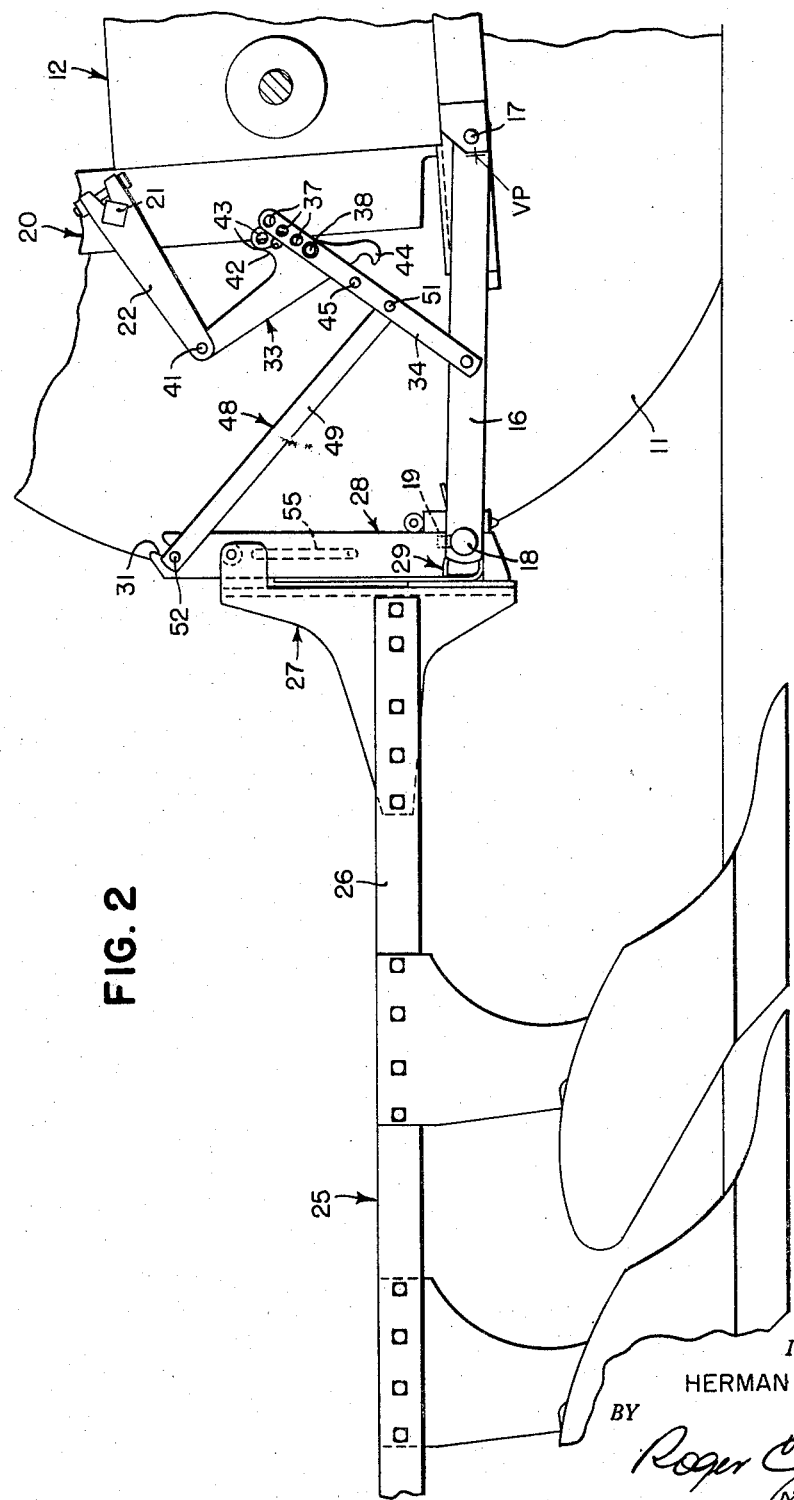
Fig. 2 is a view similar to Fig. 1, showing the implement in its normal operating position, working at the desired depth of operation.
Figure 3:
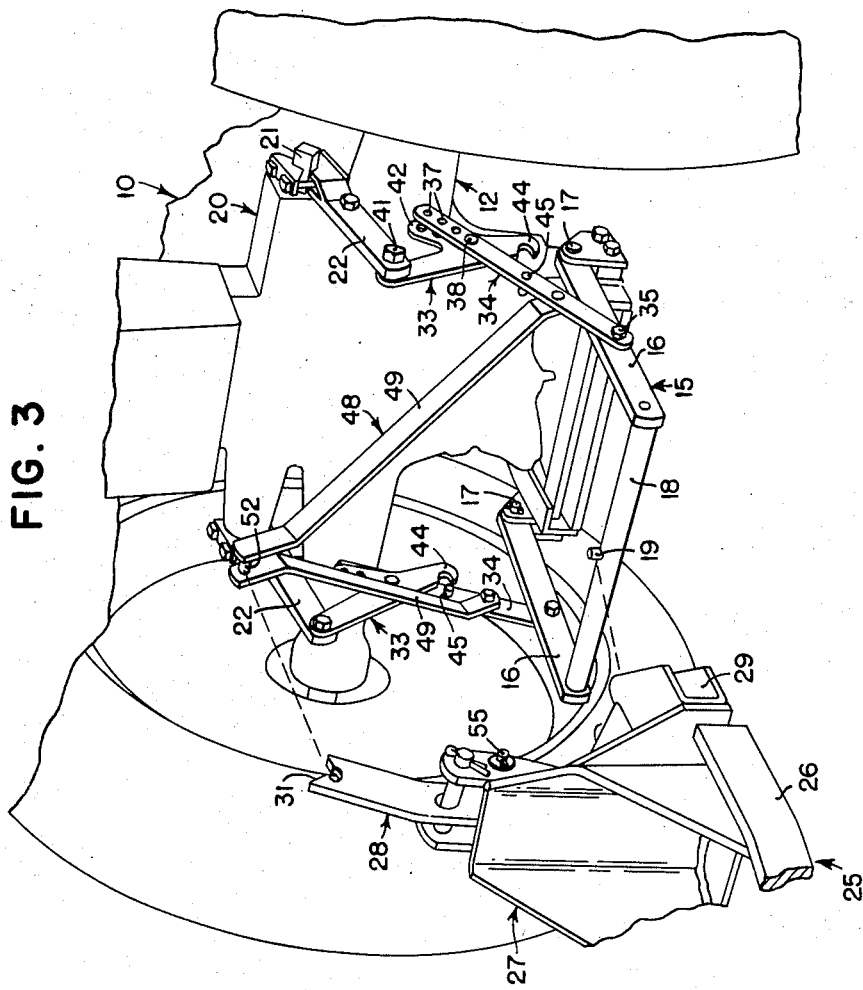
Fig. 3 is a perspective view of the hitch device shown in Figs. 1 and 2.

Referring now more particularly to Figs. 1 and 2, the present invention is shown in Fig. 1 as adapted to be attached to a tractor 10 of the type which includes a pair of rear tractor wheels 11 carried on axle shafts mounted for rotation in the rear axle 12 of the tractor. The latter includes a laterally rigid, generally vertically swingable drawbar or bail member 15, which consists of two side bars 16 that are pivotally connected at their forward ends to the tractor, as at 17, and rigidly connected, as by welding, to a rear crossbar 18, the central portion of which carries an upstanding attaching pin 19. The tractor 10 also includes a power lift structure 20, of conventional construction so far as the present invention is concerned, which includes a transverse rockshaft 21 and lift means in the form of a pair of generally vertically swingable lift arms 22.

For the purposes of illustrating the principles of the present invention, the same is shown as incorporated in hitch means operatively connecting a ground-working implement 25, such as a three-bottom plow, with the tractor 10. The plow 25 includes a frame 26 carrying, at its forward end, a vertically extending frame or mast structure 27. The latter includes a mast section 28 having a socket portion 29 at its lower end shaped to receive the crossbar 18 of the tractor drawbar bail 15. The upper end of the mast section 28 is provided with a pin-receiving notch 31.

Each of the lifting arms 22 is connected with the associated drawbar member 16 by link means in the form of a pair of pivotally interconnected links 33 and 34. The lower link 34 is pivoted, as at 35, to the associated drawbar member 16, the upper end of each link 34 being provided with a plurality of pivot-receiving apertures 37. A pivot 38 may be disposed in any of the apertures 37. The upper link 33 is of special construction. The upper end is pivoted, as at 41, to the rear end of the associated lift arm 22, and each link member 33 is provided with an extension 42 that, as best shown in Fig. 2, is also provided with a plurality of openings 43 that are adapted to register with the openings 37 in the lower link member 34. The associated pivot pin 38 may be disposed in any pair of registering openings 37, 43. The lower portion of each of the link members 33 is provided with an abutment section in the form of a hook or stop 44 that cooperates with a stop pin 45 carried on each of the lower link members 34. An upper link member 48 is formed as a generally V-shaped member, with link bar sections 49 diverging forwardly and apertured to receive a pivot 51 that connects each section 49 with the associated lower link 34. The rear ends of the upper link bars 49 are brought close together and interconnected by a cross pin 52 that serves as a connection between the upper link member 48 and the upper end of the mast section 28, the pin 52 being adapted to enter the slot or notch 31 at the upper end of the mast 28. The lateral position of the mast 28 relative to the plow frame 26 is adjusted by means that includes a hand crank 55, this mechanism being conventional so far as the present invention is concerned.

The operation of an implement incorporating the present invention is essentially as follows.

Fig. 2 shows the plow 25 in normal operating position. The power lift 20 of the tractor is actuated to permit the arms 22 to swing downwardly to about the position shown in Fig. 2, in which they are prevented from further downward swinging movement but are free to swing upwardly. With the pivotally interconnected links 33 and 34 arranged as shown (Fig. 2), with the upper link member 48 of the hitch extending from the lower links 34 upwardly and rearwardly to the upper portion of the mast section 28, the plow 25 is capable of relatively free vertical swinging movement, either upwardly or downwardly from the position shown in Fig. 2, the linkage system shown providing for a virtual hitch point located about at the point VP located as shown in Fig. 2, with the pivot 38 located in the lowermost of the openings 37 and 43. With the pivot pin 38 in the upper openings, the virtual hitch point is disposed in positions more forward, relative to the tractor, than the position of the hitch point VP in Fig. 2. The hitch points, in all positions of the pins 38, are located generally underneath the rear axle 12 of the tractor and provide for a line of draft that, in the first place, lies at a forwardly and upwardly extending angle so that a portion of the soil resistance is added to the tractor to increase the traction thereof while, at the same time, the plow remains in the ground and operates steadily without undue variations. If, in operation, it should be desired to change the depth of plowing, the tractor power lift 20 is operated to raise the lifting arms 22, in case it is desired to reduce the depth of plowing, or to lower the lifting arms 22, in case it is desired to increase the depth of plowing. By raising the arms 22, it will be seen that the links 33 and 34 will be shifted so as to exert a generally rearwardly directed thrust through the upper link 48 against the upper portion of the mast section 28 of the implement. This has the effect of raising the front end of the implement, as about the rear furrow wheel (not shown) of the plow as a fulcrum, thus reducing the depth of plowing. If it should be desired to increase the depth of plowing, the arms 22 are permitted to lower, which action takes place immediately upon actuation of the tractor power lift unit 20, since in normal operation a forwardly directed thrust is transmitted through the link 48 against the lower links 34, with the result that the plow bottoms will immediately start to move downwardly into a position of increased depth.

When it is desired to raise the plow into a transport position, the power lift 20 is actuated to swing the lift arms 22 upwardly. The first action that takes place is the generally rearwardly directed thrust exerted through the upper link 48 against the upper portion of the mast section 28. This, as in the case of reducing the depth of plowing, immediately tilts the implement generally rearwardly and thus causes the plow to run upwardly into a position of reduced depth. At or adjacent the point at which the plows leave the ground, the hook or abutment sections 44 on the upper links 33 come into contact with the stop pins 45, after which further upward movement of the lift arms 22 swings the implement and hitch links generally bodily about the axis of the pivots 17 at the forward ends of the draft bail 15. At the time that the tractor lift links or arms 22 reach their uppermost positions, all of the openings 37 are in registry with all of the openings 43 in the link members 34 and 33. Thus, the implement is brought to the same transport position, irrespective of whether the pivots 38 are in the lower openings or the upper openings. Changing the positions of the pivots 38 serves to change the position of the virtual hitch point, as described above.

In this way I have provided a very simple but effective hitch connection between a ground-following implement and hitch-propelling tractor which provides the desired line of draft, with the required traction increase in action, but with simple and effective means for controlling the depth of operation and for lifting the implement into position for transport. The implement in operation remains substantially at the desired depth of operation but does not require any outside source of power, such as a hydraulic ram or the like for constantly raising and lowering the implement with respect to the tractor, as is found in some systems with which I am familiar.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A hitch device for connecting an implement having upper and lower connecting points with a tractor having a power-operated lifting means, a tension link means adapted to be connected at its rear end with the lower implement connecting point and at its forward end with the tractor, a pair of pivotally interconnected link means connected at their lower ends with said tension link means and adapted to be connected at their upper ends with said lifting means, each of the link means of said pair of pivotally interconnected link means including a pair of upper and lower links pivotally interconnected and disposed at an angle to one another when the implement is in operation, link means pivoted at its forward end with one of said pivotally interconnected links and adapted to be connected at its rear end with the upper of said implement connecting points, stop means carried by one of said upper and lower links for limiting the movement of the other link relative thereto, and each of said pairs of upper and lower links having a plurality of pivot-receiving openings, said openings and said stop means being located so that all of said openings are in registry when said power-operated lifting part is in its uppermost position, and a pivot removably disposable in each of said sets of registering openings.

2. A hitch device for connecting an implement having upper and lower connecting points with a tractor having a power-operated lifting part, a tension link means adapted to be connected at its rear end with the lower implement connecting point and at its forward end with the tractor, a pair of generally vertically extending link members, one disposed above the other and said link members being pivotally interconnected at their adjacent end portions, means connecting the upper end of the upper link member with said lifting part, means connecting the lower end of the lower link member with the tension link means, said upper and lower link members being arranged in converging relation with their pivotally interconnected end portions lying at a point spaced in a fore-and-aft direction relative to a line joining the upper pivot of the upper link member and the lower pivot of the lower link member, and link means pivoted at its forward end with one of said pivotally interconnected links and adapted to be connected at its rear end with the upper of said implement connecting points.

3. A hitch device for connecting an implement having upper and lower connecting points with a tractor having a power-operated lifting means that includes a lift arm swingable relatively freely in an upward direction, a tension link means adapted to be connected at its rear end with the lower implement connecting point and at its forward end with the tractor, a pair of pivotally interconnected links arranged one above the other, means pivotally connecting the upper end of the upper link with the rear end of said lift arm, means pivotally connecting the lower end of the lower link with said tension link means, said pair of links being shiftable at their interconnected portions so as to swing in a generally fore-and-aft direction, and thrust link means pivoted at its forward end with said portion of one of said pivotally interconnected links and adapted to be connected at its rear end with the upper of said implement connecting points.

4. A hitch device for connecting an implement having upper and lower connecting points with a tractor having a power-operated lifting means including a generally upwardly movable part adapted to be held in different positions, a tension link means adapted to be connected at its rear end with the lower implement connecting point and at its forward end with the tractor, a pair of pivotally interconnected link means connected at their lower ends with said tension link means and adapted to be connected at their upper ends with said lifting part, each of the link means of said pair of pivotally interconnected link means including a pair of upper and lower links pivotally interconnected and disposed at an angle to one another when the implement is in operation, and link means pivoted at its forward end with one of the links of each of said pivotally interconnected link means and adapted to be connected at its rear end with the upper of said implement connecting points, said pivotally interconnected link means being disposed with their interconnected portions located forward of a line extending from the point of connection of each upper link with said lifting part to the point of connection of the associated lower link with said tension link means, whereby when a lifting effort is exerted by said lifting part through said links against said lower tension link means, an upwardly and rearwardly directed force is applied through said upper link means to the upper connecting point of said implement unit.

References Cited in the file of this patent

UNITED STATES PATENTS

| | | |
|---|---|---|
| 2,597,692 | Wills et al. | May 22, 1952 |
| 2,611,304 | Toland | Sept. 23, 1952 |
| 2,658,438 | Seng | Nov. 10, 1953 |